(12) United States Patent
Kinkaid et al.

(10) Patent No.: US 7,287,954 B2
(45) Date of Patent: Oct. 30, 2007

(54) OMNI DIRECTIONAL BAFFLED WIND ENERGY POWER CONVERTER APPARATUS AND METHOD

(75) Inventors: Christopher Piper Toby Kinkaid, Portland, OR (US); Peter L. Coye, Claremont, CA (US)

(73) Assignee: California Energy & Power, Pomona, CA (US)

( * ) Notice: Subject to any disclaimer, the term of this patent is extended or adjusted under 35 U.S.C. 154(b) by 84 days.

(21) Appl. No.: 11/238,804

(22) Filed: Sep. 30, 2005

(65) Prior Publication Data

US 2007/0077145 A1 Apr. 5, 2007

(51) Int. Cl.
*F03D 7/06* (2006.01)
*F03D 3/06* (2006.01)

(52) U.S. Cl. .................... 415/4.2; 415/4.4; 416/236 R; 416/197 A

(58) Field of Classification Search ................. 415/4.2, 415/4.4, 907; 416/197 A, 232, 233, 235, 416/236 R, 237, 243, DIG. 4
See application file for complete search history.

(56) References Cited

U.S. PATENT DOCUMENTS

| | | | |
|---|---|---|---|
| 1,697,574 A | 1/1929 | Savonius | |
| 1,766,765 A | 6/1930 | Savonius | |
| 3,918,839 A | 11/1975 | Blackwell et al. | |
| 3,995,170 A | 11/1976 | Graybill | |
| 4,115,032 A | 9/1978 | Lange | |
| 4,264,279 A | 4/1981 | Dereng | |
| 4,281,965 A | 8/1981 | Stjernholm | |
| 4,293,274 A | 10/1981 | Gilman | |
| 4,382,191 A | 5/1983 | Potter | |
| 4,543,042 A | 9/1985 | Lange | |
| 4,718,821 A | 1/1988 | Clancy | |
| 6,428,275 B1 | 8/2002 | Jaakkola | |
| 2004/0061337 A1 | 4/2004 | Becker | |
| 2005/0099013 A1 | 5/2005 | Noguchi | |
| 2006/0257240 A1* | 11/2006 | Naskali et al. | ............... 415/4.4 |

* cited by examiner

*Primary Examiner*—Edward K. Look
*Assistant Examiner*—Dwayne J White
(74) *Attorney, Agent, or Firm*—William W. Haefliger

(57) ABSTRACT

A wind turbine apparatus, comprising an upright shaft defining an upright axis, at least two blades operatively connected to the shaft to rotate about the shaft axis as the blades are wind driven about the axis, the lowermost portion of each blade being offset, azimuthally, relative to the uppermost portion of each blade, baffles carried by the blades to project directionally to receive impingement of wind for creating torque transmitted to the blade to effect blade rotation about the axis.

27 Claims, 10 Drawing Sheets

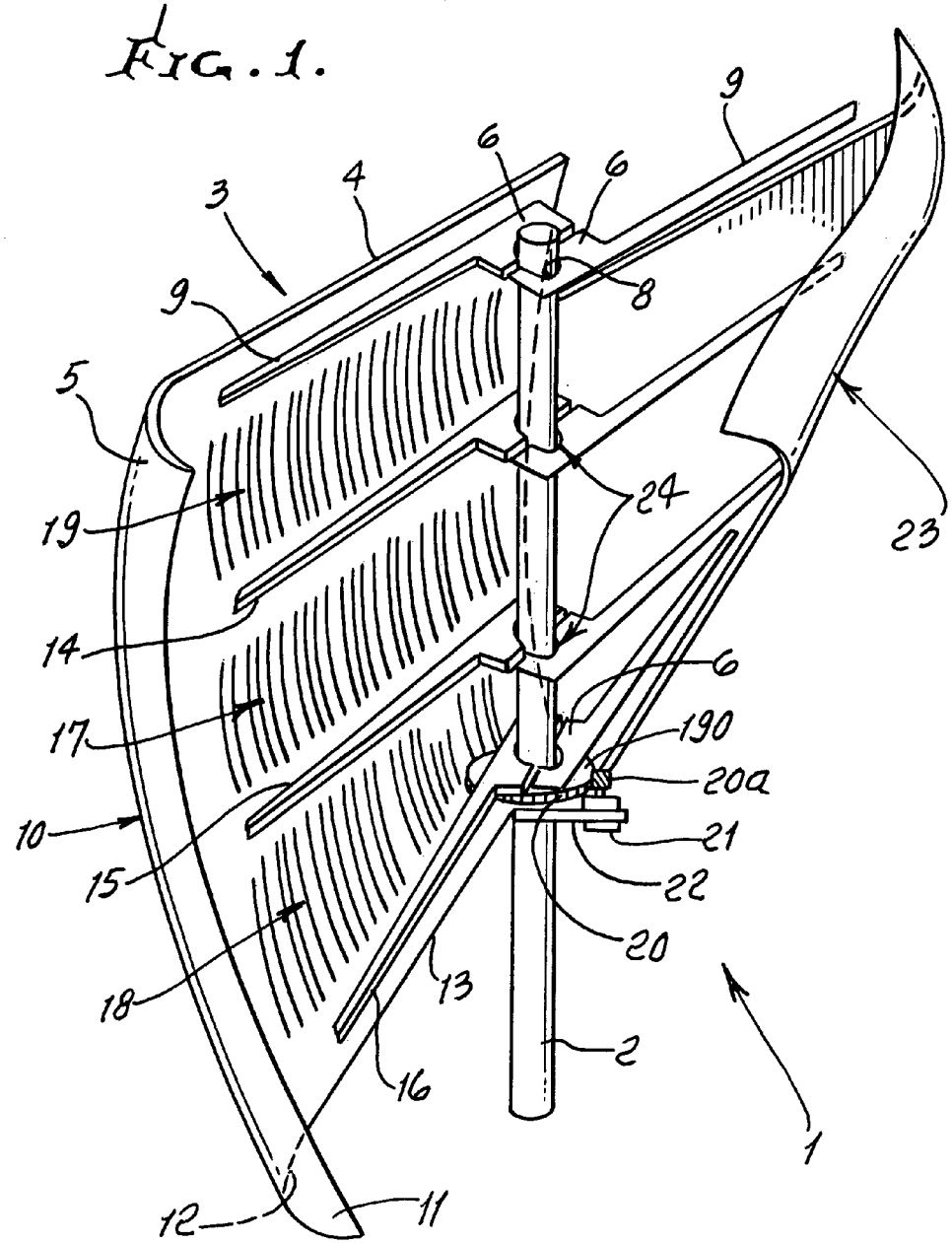

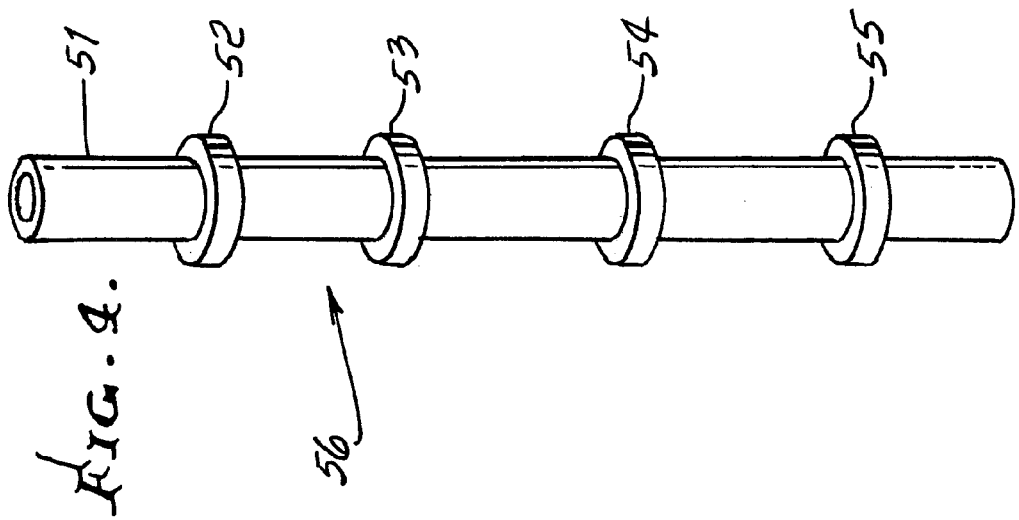
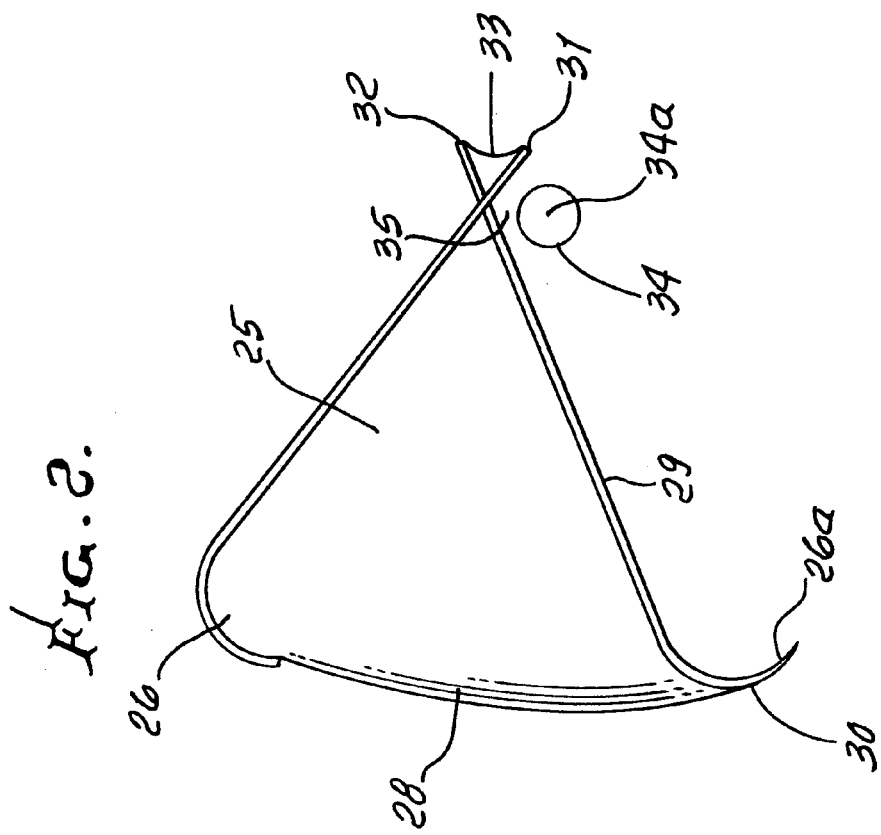

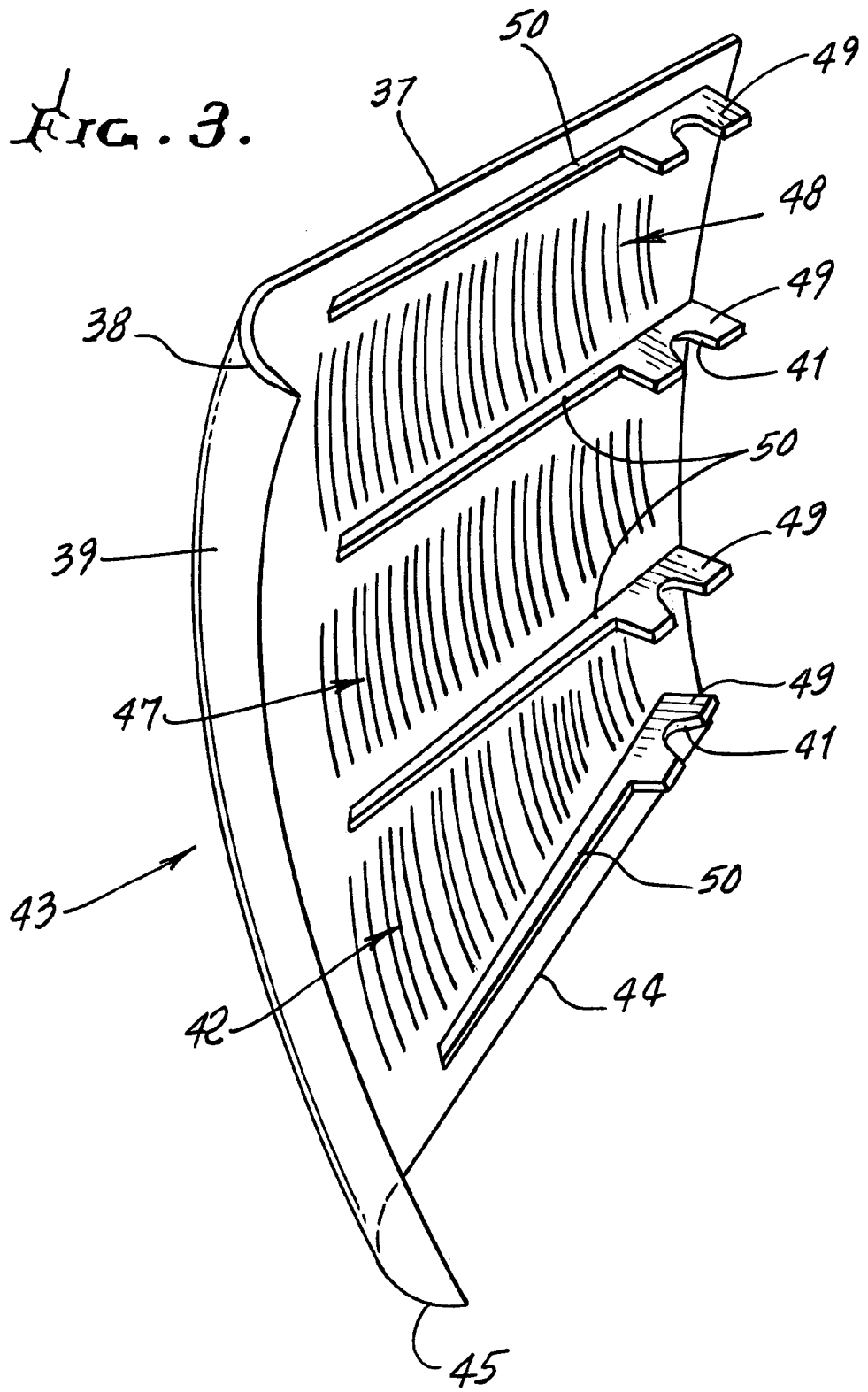

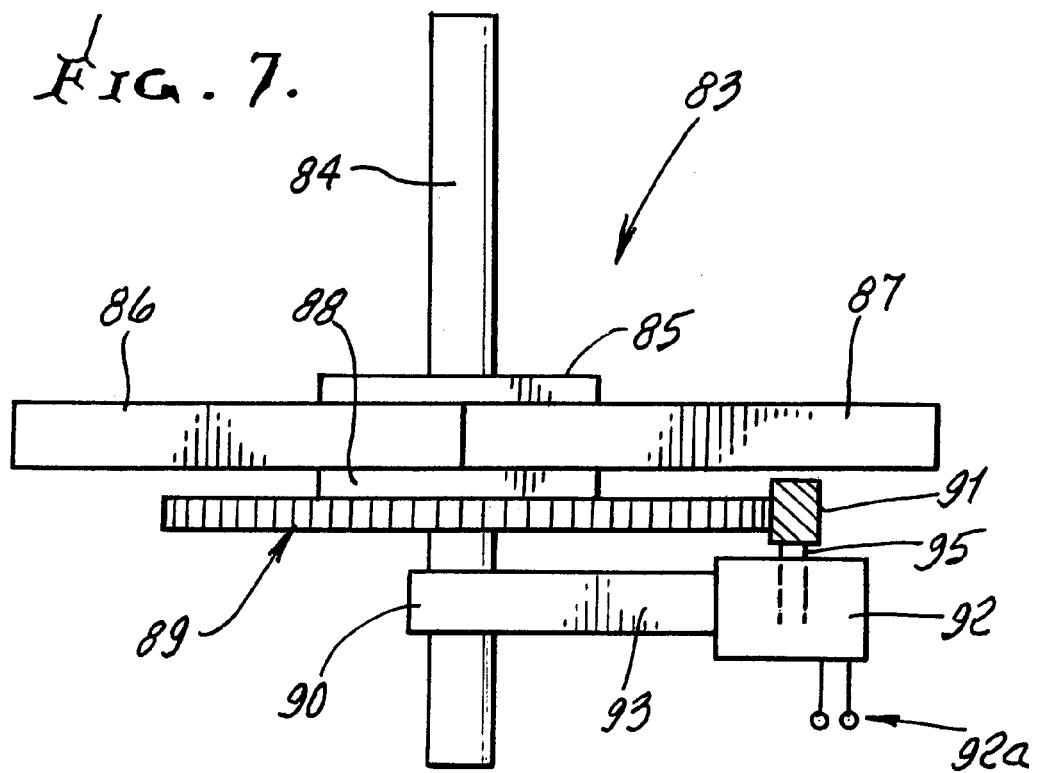
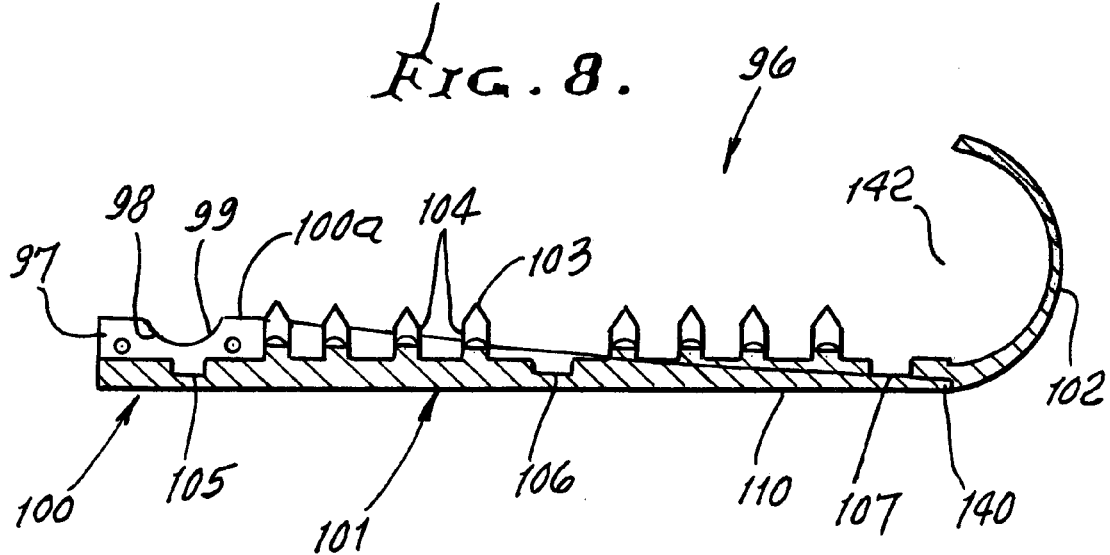

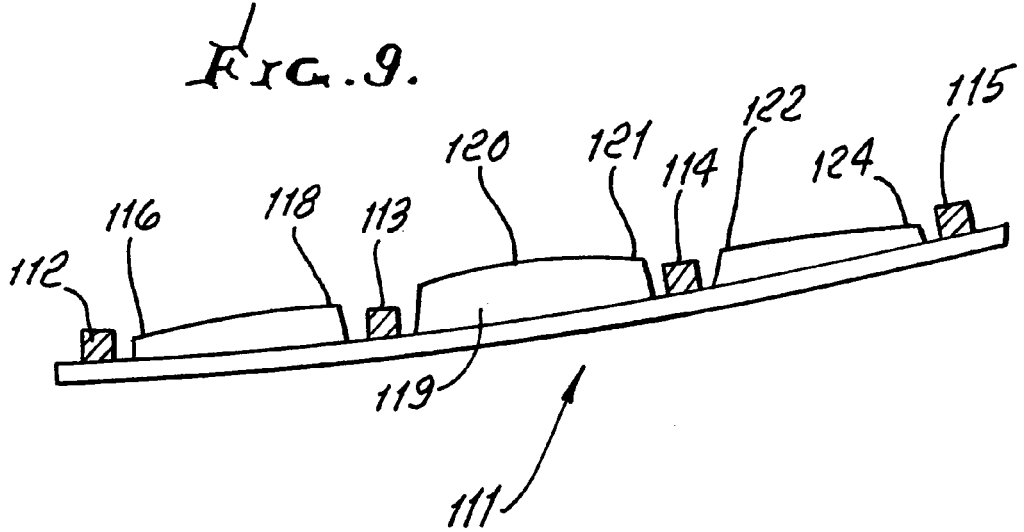
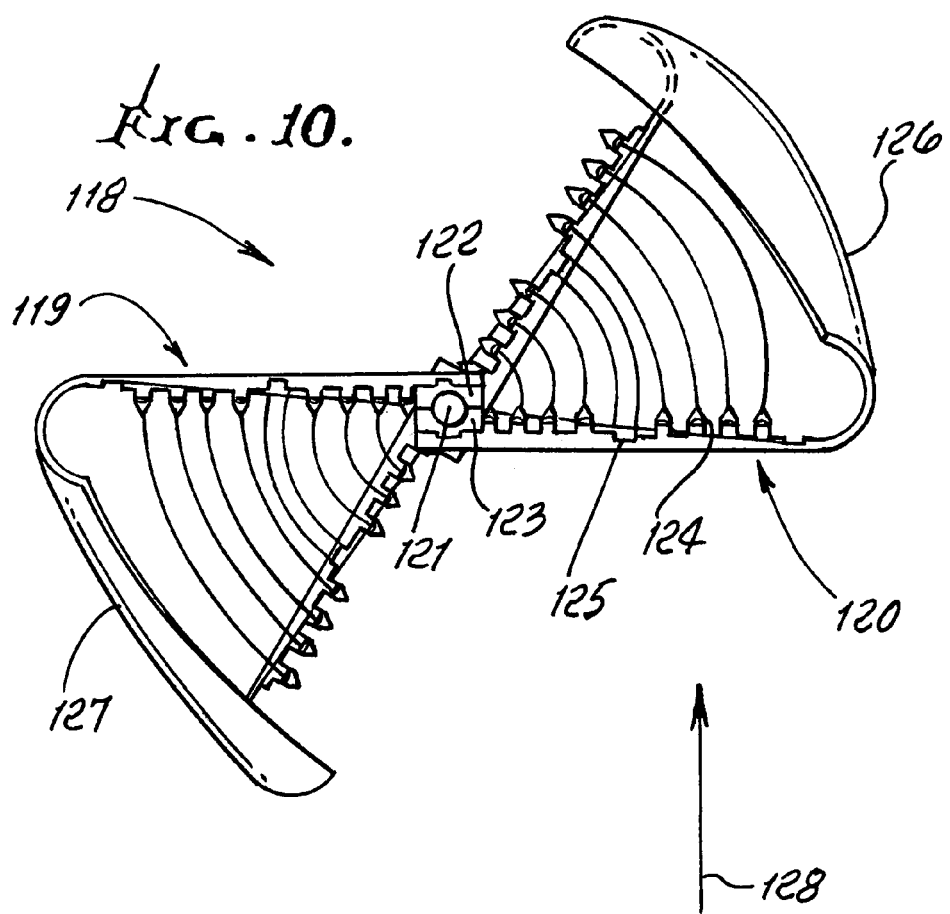

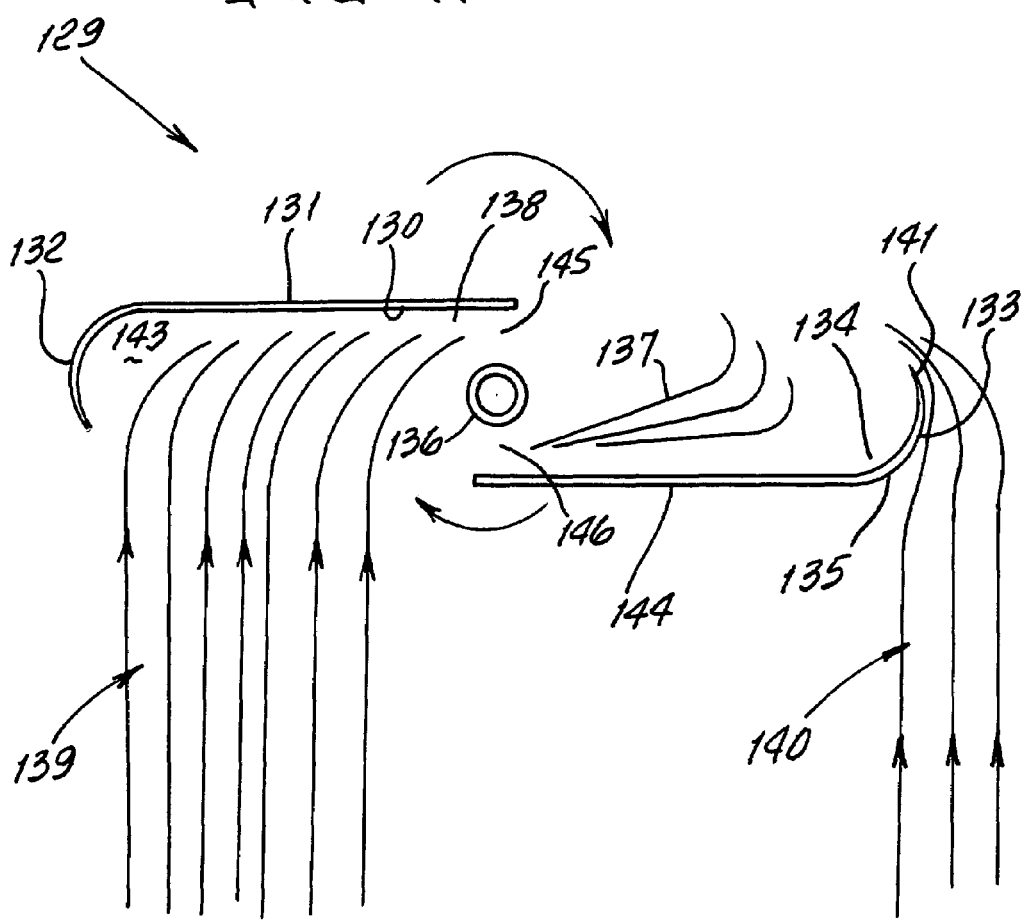

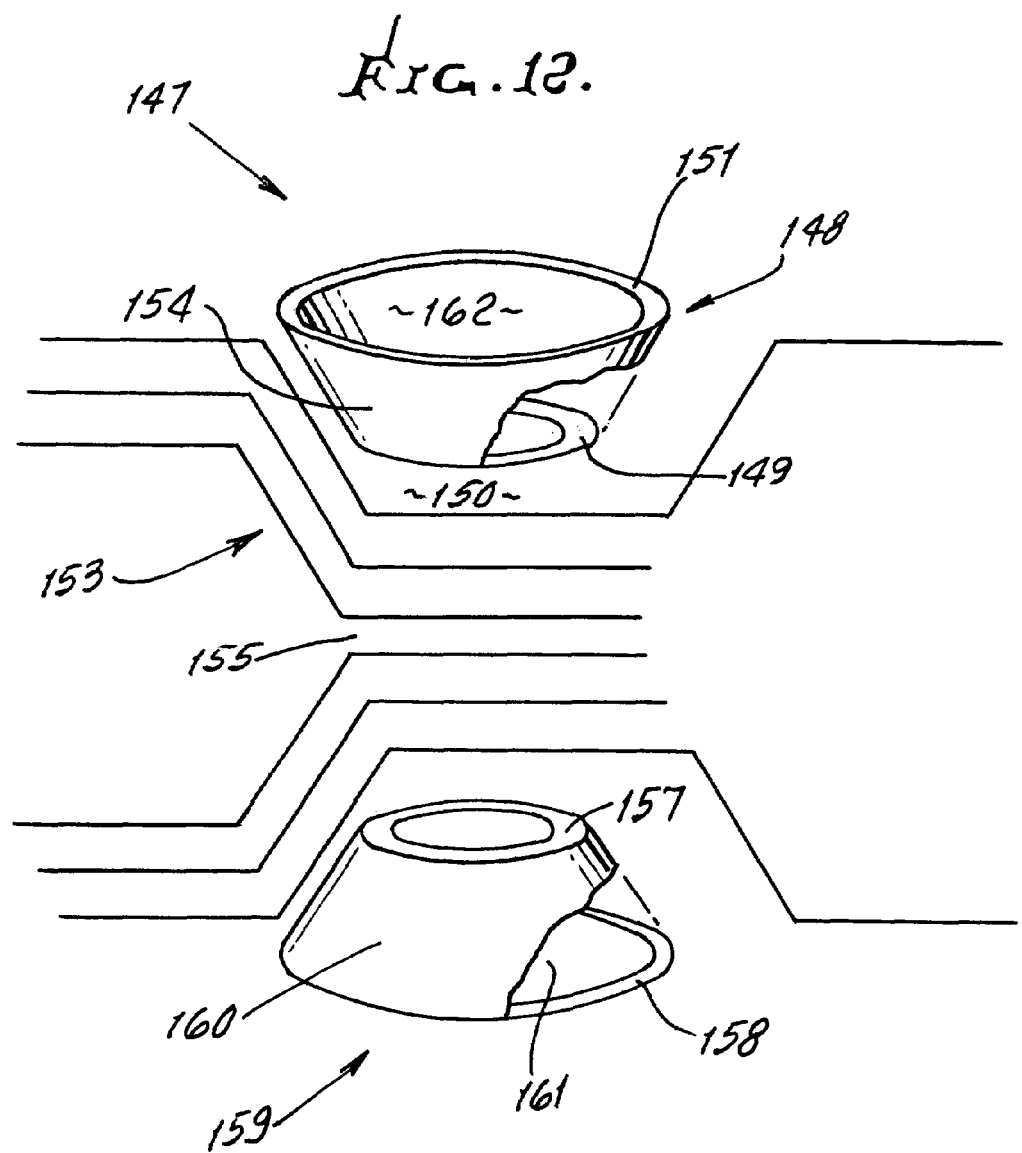

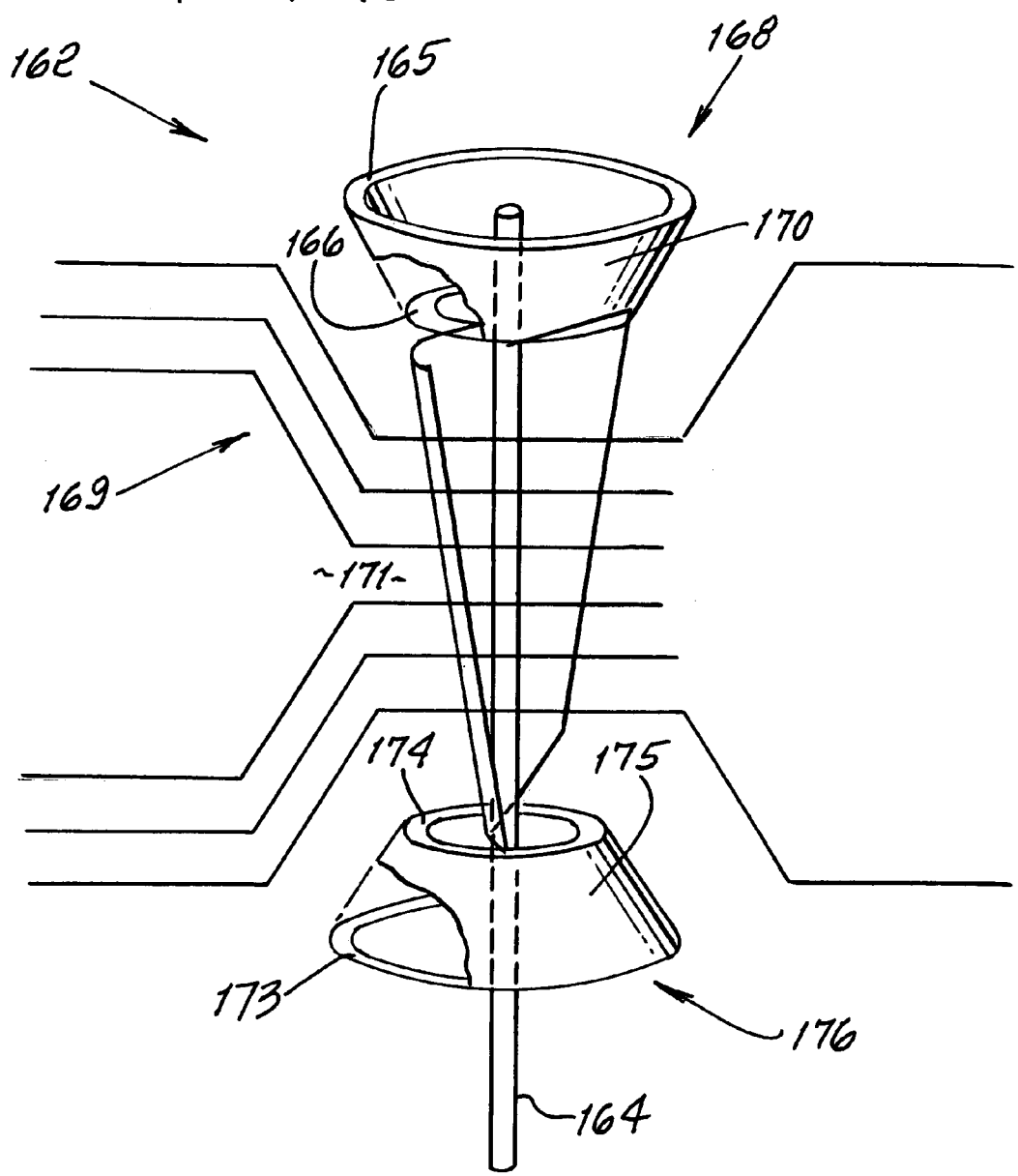

OMNI DIRECTIONAL BAFFLED WIND ENERGY POWER CONVERTER APPARATUS AND METHOD

BACKGROUND OF THE INVENTION

This invention relates generally to wind turbine apparatus, and more particularly to improvements to the construction, efficiency, and usefulness of such devices.

Wind turbine devices are disclosed in U.S. Pat. No. 1,766,765 to Savonius, and U.S. Pat. No. 4,293,274 to Gillman. There is need for improvements to such devices, and particularly to improvements as referred to above, enabling efficient generation of electrical power.

SUMMARY OF THE INVENTION

It is a major object of the invention to provide wind turbine apparatus basically comprising
  a) an upright shaft defining an upright axis,
  b) at least two blades operatively connected to the shaft to rotate about the shaft axis as the blades are wind driven about that axis,
  c) the lowermost portion of each blade being offset, azimuthally, relative to the uppermost portion of each blade,
  d) baffles carried by the blades to project directionally to receive impingement of wind for creating torque transmitted to the blades to effect blade rotation about said axis.

As will be seen, the baffles typically project from each blade generally toward the axis, along the baffle lengths, which are elongated in parallel relation.

Another object includes provision of vertically spaced ribs integral with each blade, and operatively connected to the shaft. As will be seen, the ribs may be operatively connected to the shaft, as via bearings, with groups of the baffles located between successive ribs. Plates may be provided to be integral with the ribs, to be mounted on bearings at the shaft.

A further object includes provision of spacing between ends of the baffles and the ribs, defining air flow channels adjacent the ribs. As will be seen, baffles are typically located in rows, the baffles in at least one row being concave in directions away from the blade.

Yet another object includes provision of blades, each of which has curved foil configuration extending lengthwise at blade edge extent farthest from the shaft, to face toward the baffles. Also, the blades preferably have portions that extend in proximity to said post, but a flow vent or gap or gaps is or are defined between said portions of the blade, and the post, such a gap or gaps allowing air flow venting to prevent noisiness of blade operation.

A further object of the specific invention is to efficiently capture and convert the impulse available in the wind into rotational torque that is translated into mechanical energy or directly into electricity by blade driving of an electrical generator or other suitable power converter.

Another object of the specific invention is to provide an apparatus and method to convert uneven and turbulent incoming air into useful mechanical or electrical energy. It is yet another object of the invention to provide blades that accept incoming air flow from any direction, the turbine thereby being omni-directional.

Yet another object of the specific invention is to produce useful mechanical and electrical energy while being visible to birds and other wildlife minimizing any danger or impact to indigenous life forms.

An additional object is provision of blade configuration for self-starting, in very low wind speeds, and also to operate reliably in the outdoor environment, coping with temperature cycling and extremes, humidity changes, vibrations, particulates in air flow, airborne debris, and other externalities faced in an outdoor deployment. Another object invention is to provide for efficient conversion of wind energy into electricity or mechanical energy over a wide range of wind speeds, and especially at low wind speed, and high wind speed conditions without over speeding the wind generator. Another object is provision for self-starting in low wind speeds under load, to increase the suitable sites at which wind generators can be employed. Yet another object is to provide rugged apparatus to survive hurricane strength wind speeds without the need for any mechanical or electrical over speed protection or braking.

Another object is to reliably operate over a large range of wind speeds with near silent operation. Yet another object of the present invention is to provide a means of communications by providing a rotating symmetrical working surface to which words, images, logos and other communications may be posted and displayed. Another object of the present invention is the integration to the device or blades of light emitting diodes, fluorescent strips, or electroluminescence lighting elements or plurality of elements that emit light during nighttime and or daytime operation, for use as safety beacons, warning lights, area and sign lighting and other lighting applications including advertising.

An added object is to provide a highly efficient wind responsive generator apparatus for generating useful work from moving air in the form of mechanical or electrical energy. The invention can also be applied in underwater applications for converting the energy of flowing water into electrical or mechanical energy capable of doing useful work. The apparatus can be partially or totally submerged, and can be employed as a power converter for underwater environments, salty or fresh, with an appropriately sealed electrical interconnection.

These and other objects and advantages of the invention, as well as the details of an illustrative embodiment, will be more fully understood from the following specification and drawings, in which:

DRAWING DESCRIPTION

FIG. 1 is a perspective view of blades or wing elements rotating about a central upright element;

FIG. 2 is a schematic top plan view of a simple blade or wing element;

FIG. 3 is a perspective view of the inner side of a blade or working surface wing element;

FIG. 4 is a front perspective view of a central post, with associated bearings;

FIG. 7 is a vertical section taken through the power train, shown in schematic form;

FIG. 8 is a lateral cross-section taken through a blade or wing element;

FIG. 9 is a longitudinal view taken in section through the blade, showing baffles, or cross-sections through ribs;

FIG. 10 is a top plan view of two blades rotating about an associated post;

FIG. 11 is a schematic horizontal section showing principles of operation of two blades;

FIG. 12 is a schematic showing principles of operation; and

FIG. 13 is another schematic showing principles of operation.

DETAILED DESCRIPTION

Figure 5:
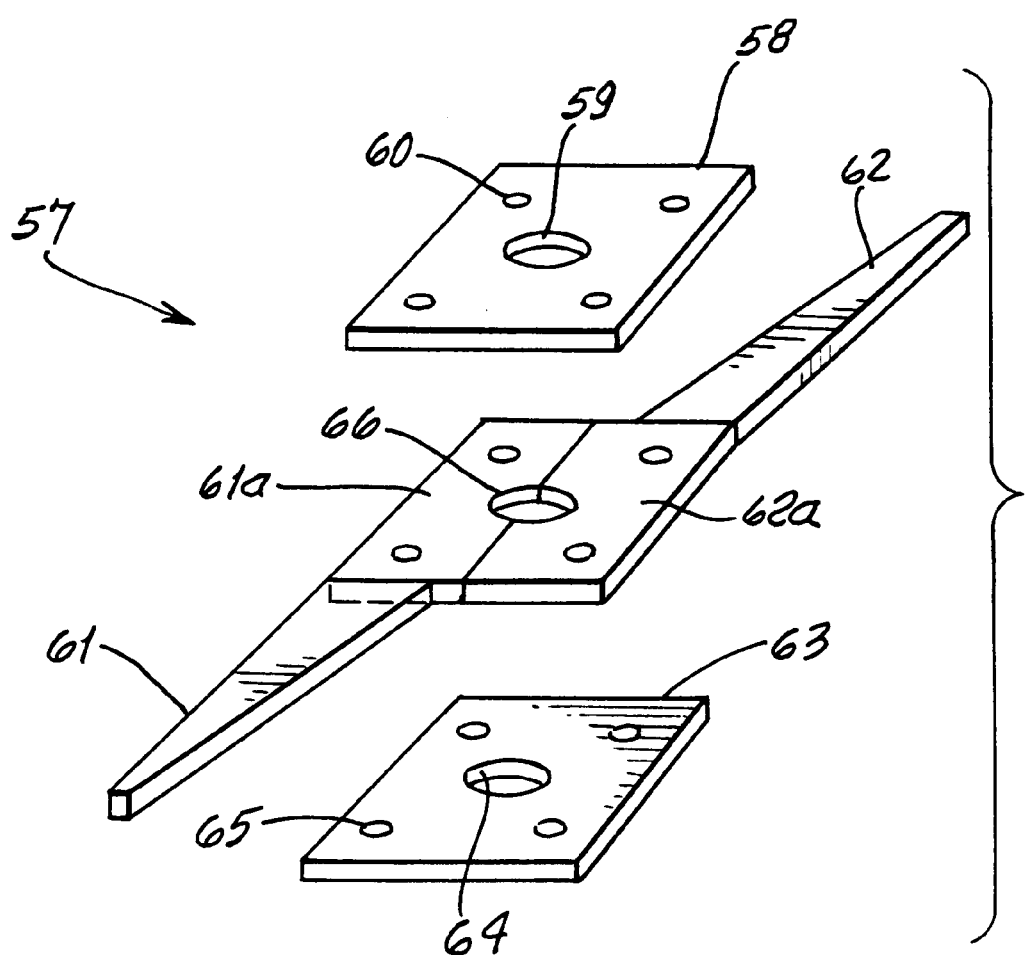
FIG. 5 is an exploded perspective view of blade rib brackets adapted for assembly to bearings on the post.

To achieve the above and related aims, the present invention provides an apparatus shown in perspective at 1 in FIG. 1, and comprising a shaft or post 2 extending upright or at other angle, depending on orientation to which the apparatus is attached and deployed in the field. Single element blade, or wing sections 3 are deployed as shown. They may be molded by roto-molding, or injection molding, or other known molding techniques. Wing elements or sections 3 are attached to the main support shaft 2 symmetrically, in pairs or higher numbers by employing a molded rib element or elements 9, 14, 15 and 16 integrated into the wing element.

The wing element 3 comprises a straight section 4 terminating transversely at an arc section 5 of a circle to be described in detail below. Preferably, arc extends through an angle from about 105 to 125 degrees. The structure 4 and 5 of wing or blade section 3 is twisted over the upright length 10 of the wing by an angle of about pi/3 which is about 60 degrees. This turning angle may be from 15 to 89 degrees, with 60 degrees as a general preferred embodiment. Thus, the lowermost portion of each blade or wing section is offset, azimuthally relative to the uppermost portion of each blade. The turning angle starts at the top of the wing straight section 4 and extends through to the bottom of the wing indicated at 13, having terminal arc section 11. Integrated into the single wing section 3 are the support rib elements 9, 14, 15 and 16, these being spaced apart as shown. A plurality of baffles are also integrated into the wing section 3. These are shown at 17, 18 and 19, in three laterally extending rows, the baffles spaced apart and extending generally upright. The baffles may extend in the space through the length of the wing element from top to bottom. The baffles are better seen in detail in FIG. 8, to be discussed.

The baffles 17-19 and grooves therebetween provide additional wind resistance on the downwind side of the wing element providing more grip and therefore more extraction of impulse from the moving air upon the working surfaces. The bifacial wing element 3 performs several simultaneous functions. It has an enhanced ability to extract impulse from the wind by maximizing its resistance to the wind on the down stream side of the element when the wind impinges from various obtuse angles. The element has an un-textured and smooth upstream side to minimize resistance to the wind as the wing or blades rotate 360 degrees per cycle, or turn as viewed from center axis of rotation about the support shaft 2. The wing elements with generally horizontal ribs 9, 14, 15 and 16 integrated and protruding from the wing element working surfaces produce a high tensional strength sturdy wing element 3. The rotational azimuthally turned angle from top to bottom of the wing element adds structural integrity to the element, and strength for survivability in high wind speed environments.

The rib elements 9, 14, 15 and 16 provide an efficient means for bracketing the wing elements to the center shaft 2. The plurality of baffles 17-19 also provide structural integrity to the molded wing element and great strength, giving further enhanced utility to the apparatus, especially in high wind speeds. Usable plastic materials include high density polyethylene, polypropylene and other equivalent materials.

The invention provides a method for choosing revolutions per minute rates for given wind speeds and wind zone areas. Lower average wind zones enable use of a shorter blade height to width ratio, i.e. less than one, to provide a longer moment arm and produce more torque at low revolutions per minute and low wind speeds. Conversely, a higher height to width ratio, greater than one, provides higher revolutions per minute but with less torque. Variations in dimensions of the apparatus enable optimization of power output, conversion efficiencies as tuned to the actual site specific characteristics of the wind resource, and the provision of hardware to extract useful work. A preferred height to width ratio is phi, approximately 1.618, also referred to as the golden section. Height to width ratio can be adjusted.

The bottom of the wing 3 working surface follows the same lateral configuration as the top, starting with a laterally straight section 13, and terminating at an arc section 12. The azimuth turning angle extends from the top straight section 4 to the bottom straight section 13. This turning angle can be within a range from 15-89 degrees. Using a 15 degree turning angle allows presentation of more blade surface area to the wind at any given moment and is suitable for low wind speed sites. Using an 89 degree turning angle is desirable for high wind speed sites. For a general case, about 60 degrees of turning angle is preferred. The rib sections 9, 14, 15 and 16, of each wing section 3 and 23, when assembled, wrap around seating bearings 24 that are affixed to the support shaft 2, the wing sections or blades 10 and 23 being alike. The ribs on the blades terminate at integral plates 6 that are assembled by suitable fastening, to embrace the post at plate defined holes 8.

Attached to the bottom bracket defined by plates 6 integral with bottom ribs 16 of the two blades is a power rotor 190 that is comprised of a spur gear or friction roller 20 that translates the motion of the blades or wing elements 3 and 23 into a uniform circular motion transferred to spur gear 20a. Gear 20a turns the shaft of a power converter such as a direct current generator, permanent magnet alternator or other mechanical or electrical power converter 21 supported by a mounting bracket 22 that attaches to the support shaft 2.

FIG. 2 is a top view of the bifacial working surface wing area. The working surface is formed by a straight or flat section 25 terminating at curved section 26 extending through 105 degrees of arc. Section 26 terminates at straight section 26a. The length of the segment 26 from 26 to 26a is a fraction of straight section 25 length, preferred to be 0.33-0.86 times the straight section length. This combined surface defined as a straight section connecting to the curved section at the end points produces a composite structure. That structure rotates about a center shaft center axis 34a such that a gap 35 is created between the surface of the center shaft 34 and the wind working surface as described. Gap 35 allows moving air, or water working against the wing surface to escape the blade once impulse has been extracted from the moving fluid medium such as air. Providing a central means of exit flow allows the stream of air, or water, impinging on the blades to have enhanced statistical opportunity to impart impulse to the working surfaces. The gap 35 operates as a pressure relief zone that stays constant throughout the vertical length of the twisted blade and also provides for free flow or working fluid, wind or water, or other fluid, behind the working surface as it moves into the working fluid stream.

The gap width is preferably between 1/32 and 1/16 (preferably about 1/24th) the lateral length of the straight section 25, and remains about the same throughout the turning angle of the working surface 25 and 29. The working surface elements 25 and 26 are azimuthally turned or twisted throughout the height of the blade, at a preferred angle of pi/3 which is 60 degrees. This turning angle gives the working surface increased structural strength, and provides for blade acceptance of wind from any direction, aiding in the initial turning of the working surface at low wind speeds. The bottom of the working surface is a straight section 29 terminating in a curved arc 30 of a circle. Arc 30 is preferably about 105 degrees.

The endpoints 31 on the top and 32 on the bottom of the blade are connected by the trailing edge 33 that extends the entire upright length of the working surface. This blade configuration provides the means for accepting wind from any lateral direction, and wind that is laminar or turbulent, and converts that wind force into rotational torque acting about the support shaft axis and transferred to the power rotor means driving to the electrical generator or alternator, converting rotational torque into mechanical or electrical power. The working surface 28 that forms a continuous surface from top elements 25 and 26 down to bottom elements 29 and 30 is preferably bifacial, with texturing on the inside, and a smooth surface on the opposite side. This bifacial working surface presents the most resistance to wind slippage when wind of flowing water strikes the inside surface, with ram pressure, and the least resistance to wind slippage when the wind of flowing water impinges the outside surface. This dual functioning increases the efficiency of the power conversion. Another preferred embodiment involves both surfaces being smooth. This adds utility in high wind speed zones, as the functional form of the wind surfaces work as described above.

FIG. 3 is a side view of the bifacial working surface wing element 43 showing additional aspects of the specific invention. This single element may be formed as follows: rib elements 50 (corresponding to 9, 14, 15 and 16) are incorporated and integrated into the blade working surface. The fundamental surface, as described above follows the preferred, but not limited to, formula of a straight section 37 terminating laterally with the arc segment 38 of circle forming an arc of 105-125 degrees. This shape is then twisted azimuthally at a turning angle of 60 degrees, preferred, over the entire length of the surface from top to bottom, ending with a bottom straight section 44 that terminates at 45 with an arc of a circle. The leading edge 43 forms continuity between the top elements 37 and 38 and the bottom elements 44 and 45. A bottom rib element 50 is shown incorporating a half circle at 41. Two or more of these wing elements each oriented opposite each other about the support shaft and separated about the shaft axis by an angle of pi, or 180 degrees. If three wing elements are used then the angle of separation about the shaft axis would be 120 degrees. The laterally opposite rib elements are suitably fastened together at plates 49 by nuts and bolts or other such fastener means to produce the preferred embodiment, though not limited to this disclosure.

As shown in FIG. 3, this wing element 43 incorporates a series of laterally spaced baffles 48 that comprise raised surfaces that extend between the rib elements running laterally along the length of the wing working surface, all ribs and baffles being on the blade inside surface with the outside surface being smooth. A multiple number of these longitudinally running baffles give increased structural strength to the wing element. Further, baffles 42, 47 and 48 produce an increased utility in that the working surface has more exposure, surface area, to moving air and can increase the impulse extracted from moving air across the working surface. The baffles at 42, 47 and 48 are convex in shape along their longitudinal lengths, with a raised surface peaking from 6-22 millimeters above the blade inner surface. This is a preferred height. The baffles 47 are formed in a concave shape and comprise grooves in the blade working inner surface. Concave baffles 47 provide increased structural integrity in a molded, fabricated or cast part. Note azimuthally offset or turned extent between 37 and 44. The array of baffles functions to provide more surface area exposed to the wind flow at obtuse angles about the blade axis of rotation about the central post. A consistent hole pattern 41 in the flat plate section 49 of the ribs 50 provides a means of interconnection of two, or more, wing sections at the same level, to produce an integral structure. The backside 39 of the working surface is smooth to lower resistance to the working fluid when the working surface turns into the wind in its 360 degree rotational cycle. In FIG. 3, 42 indicates a lowermost array of baffles; 36 is the inner terminus of 37; 40 is the inner edge of blade 43; and 46 is the turned edge of foil 39.

Two or more of these blades are mounted with a 180 degree rotation about the center support shaft. Their bifacial working surfaces catch the wind downstream, and turn into the wind upstream, alternating between the textured inside surface with maximum resistance, and the smooth side that presents a minimum resistance. A plurality of surfaces alternate through the rotational cycle such that a textured high resistance side is always available for the ram pressure of the impinging working fluid.

FIG. 4 shows a center support post 56, which may be a pipe preferably of Schedule 80 or greater strength. Double sealed marine or military grade bearings are secured around the pipe at equal spacing to match the rib pattern described above. These bearings 52, 53, 54 and 55 are typically sealed bearings, and made of chrome steel. Bushings or other types of bearings can be used, but the preferred embodiment comprises double sealed bearings. The bearing outside diameter is matched to the rib plate inside diameter as discussed above. The bearings may be secured to the support shaft 56 with the use of epoxy. A preferred epoxy is Master Bond polymer adhesive EP21TDC. The center support shaft or pipe 51 can be fabricated from materials such as steel, aluminum, carbon fiber and other know pipe materials.

FIG. 5 shows a bracket assembly 57 in exploded view, that mounts the blades that catch the moving air and translate that impulse into rotational torque. The brackets 58 and 63 are positioned above and below the levels of ribs 61 and 62. Brackets 58 and 63 have center holes 59 and 64 with diameters that exceed the diameter of the support shaft to allow free blade rotation. Four holes 60 and 65 line up with holes placed in each rib plate 61a and 62a. The entire assembly is then interconnected with fasteners. The brackets 58 and 63 provide the assembly or integration of both halves 61a and 62a of the ribs 61 and 62 about the bearings and center shaft described in FIG. 3. This integration of elements provides the utility of balance about the center axis of rotation, and provides an interconnection close to the center axis of rotation enabling a reduction of centripetal forces acting on the fasteners and other interconnecting elements.

The brackets 58 and 63 provide the proper spacing and secure each working surface through the aforementioned ribs to the bearings, with a minimum of materials and a maximum of strength required to translate the enormous forces of high wind speeds while presenting a minimum cross-section exposed to the wind for interconnection. As in FIG. 4, a center bearing 66 is seated on the support shaft and is encased by the FIG. 5 elements as shown.

Figure 6:
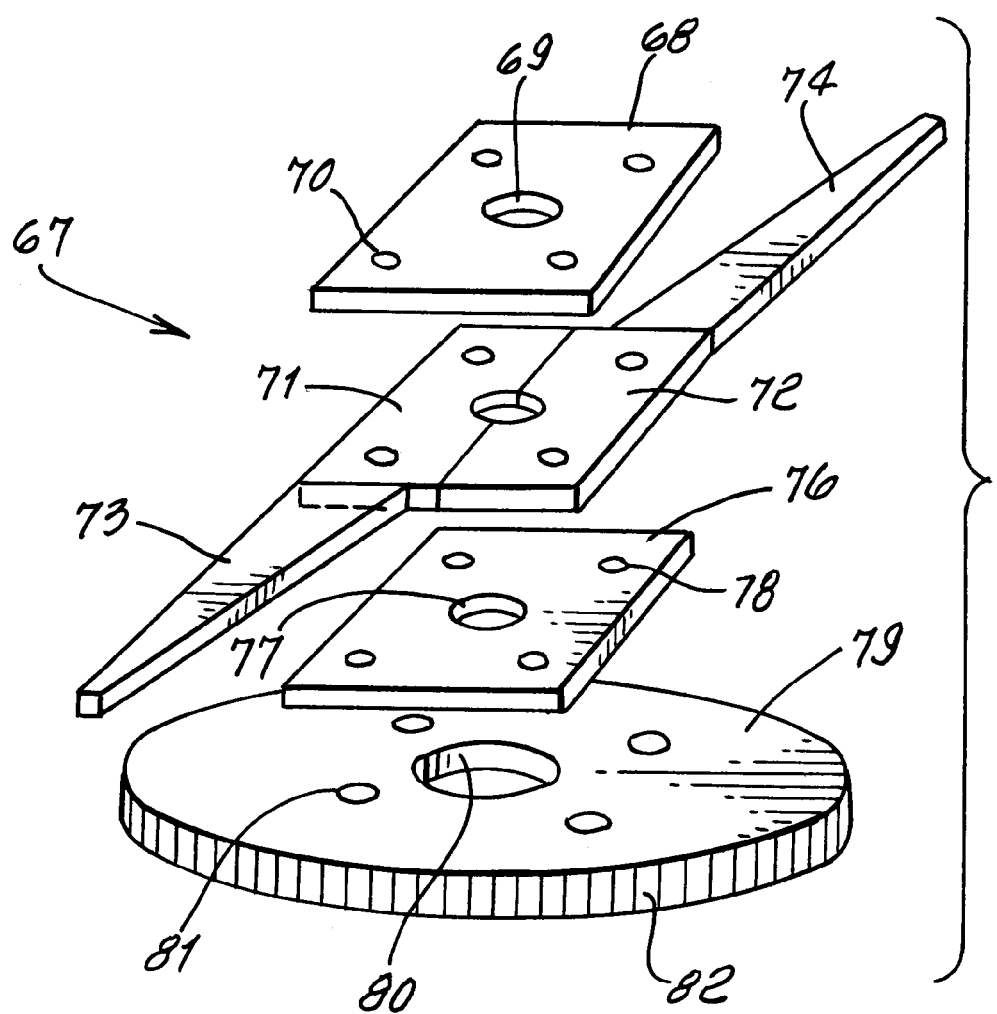
FIG. 6 is an exploded perspective view of the FIG. 5 brackets at the lower end of the blade, and an associated power train element.

FIG. 6 is an exploded view of elements of the power train 67. A power rotor disk 79 such as a spur gear attaches to the bottom of a bracket 76 corresponding to bracket 63 in FIG. 5. This element 79 power rotor comprises a disk with a center hole 80 tapped with a diameter exceeding the diameter of the center support shaft, preferably by several millimeters for sufficient clearance, so that disk 79 rotates with the blades, free of interference with the shaft.

The power rotor 79 attaches to the bottom of the working surfaces of plates 71 and 72 through holes 81 that match the hole pattern of the brackets 58 and 63 as described above in FIG. 5. Fasteners known in the art are attached through the holes 70 and 81 and secure the power rotor 79 to the blade.

The outer diameter of the power rotor 79 is such as can be to provide the optimum gearing ratio for the alternator or power converter attached to the power rotor. The edge 82 of the power rotor 79 such as a spur gear is configured to translate rotational torque to drive an electrical power converter. The power rotor edge 82 can also be grooved to seat a belt drive or other means to transfer power from the rotor to a suitable power converter such as an electrical generator, permanent magnet alternator, self-excitation alternator or other known electrical or mechanical power converters. The rib elements such as plates also are made with a hole pattern 75 that matches the hole patterns 70 and 78 and 81 on the various elements. The power rotor center hole 80 is sized just larger than the center shaft, not shown, for clearance and free movement. Brackets are shown at 68 and 76, with center holes 69 and 77. Ribs are shown at 73 and 74.

FIG. 7 is a cross section view of the power train 83 attached to the rotating blades. A top mounting bracket 85 has two wing sections 86 and 87 and bottom bracket 88 above power rotor 89. Below the power rotor and at 90 attached to the center pipe 84 is a mounting bracket 93 that supports a power converter 92 such as a permanent magnet alternator, direct current generator, self-exciting alternator or other such electrical or mechanical power converts in singular or multiple units.

The rotational torque of the power rotor 89 is transferred to the alternator or other power converter 92 through a right angle drive 91 mounted on the drive shaft 95 of the power converter 92. This combination of elements provides the utility of transferring the impulse derived from the impact of moving air, or water, upon the described blades into rotational torque that is in turn transferred to power converter 92. See output terminals 92a of the converter or generator 92.

FIG. 8 is a lateral cross-section view of the wing or blade working surface indicated at 96. The configuration includes a straight section 101 terminating at arc 102 of a circle that has a segment length preferably about 0.6 times the lateral length of the straight section 101. Section 101 joins section 102 at 140. The arc 102 is defined as a range from 105 to 125 degrees about center 142. In low wind speed zones, the larger arc near 125 degrees is used, and for high wind zones the arc value near 105 degrees is used. The preferred general wind zone arc is about 110 degrees. Cross sections like 96 but taken at successively lower elevations are twisted azimuthally through turning angles between 15 and 89 degrees, and preferably about 60 degrees. The wing section 96 has rib structure 97 that is molded with a matching hole pattern 98 with a semi circle 99 such that when two of the plates 100 are attached to one another, a tight fit is achieved at edge 100a. The rib element 97 then tapers laterally to the end point 110.

Baffles 104 are formed into the surface of the wing or blade 96 to provide an enhanced structural integrity and function to provide additional friction for the working fluid, wind or water that impinges upon the blade. The baffles extend longitudinally from the top to the bottom of the blade inner working surface. Formed as a ridge, a typical baffle 104 begins at a height of between 2-6 millimeters at one end of the baffle and increases to maxima preferred to be 6-22 millimeters at locations near the middle of the baffle and declining again to the 2-6 millimeters height value near the opposite end of the baffle. An array of baffles, convex from the blade working surface is formed in a parallel plurality laterally along the blade working surface. The tops of these baffles 103 are angled and typically tapered, to provide a wave guide effect, to minimize drag when the working surface turns into the wind. Additional concave baffles 105, 106 and 107 are formed as recesses into the blade working surface. These concave baffles provide additional strength when the element is formed either by casting, injection, roto molding, or other forming means. As the blade working surface rotates through a 360 degree cycle the working surface on the textured side, that is the side with the baffles 104 and 105 produces a resistance to the working fluid such as wind. The blade surface is smooth on the other side 110 producing a minimum resistance when that surface turns into the wind. Maximum resistance to air flow is provided on the textured side, and a minimum of resistance to air flow is produced on the other side. In case of roto molding, or other such means known in the art, the wing element 96 typically is hollow. The concave channels 105-107 are indented from the textured surface such that in the molding process additional material bonds beyond the normal wall thickness inside the hollow part. This increased material adds substantial strength to molded parts, and increases the utility and survivability of the wing element when subjected to high ram pressures, further increasing the utility of the present invention.

FIG. 9 is a longitudinal cross section view 111 of the blade. The rib elements 112-115 correspond to those described above and are shown in cross section. The convex baffles are shown beginning at one end 116 with a measurement of between 2-6 millimeters in height and increase in height to location 118. A space of about 5-15 millimeters separates the baffles from the ribs. In the case of four ribs 112-115 three baffle sections are formed along the longitudinal dimension of the working surface. The middle baffle 119 begins at a height equal to the height at 118 and continues to a maximum height at 120 of 6-15 millimeters, and then tapers down to location 121 that is equal in height to location 119. The third baffle section starts at 122 with height equal to that at 121, and tapers down to a height at 124 equal to height at 116. These segmented baffle structures with this convex shaping provide a means for increasing the blade working surfaces' ability to catch the ram pressure of a moving working fluid across the surface, and provides a wave guide to lower resistance when the textured surface becomes a trailing edge as it moves into the wind or water during is rotational cycle. This bifacial working surface is therefore textured on the baffle side, and smooth on the other side 117. This plurality of baffles also provide an increased strength of the blade critical for surviving and functioning in high wind or water speeds.

FIG. 10 is a top view of an assembly 118, as described. Two blades are shown at 119 and 120, oriented and deployed opposite each other, with respect to center support shaft 121. Working fluid, wind or water, impinges on the blades which are attached to each other by the brackets 122 and 123 as described. Once these are fastened to each other about a seated bearing, the two elements 119 and 120 become one structure. The curved sections 126 and 127 become leading and trailing edges as the working surfaces 119 and 120 rotate about the center shaft 121. The baffles 124 that are convex, and baffles 125 that are concave are shown. Shown as a top view 118 it will be appreciated that the device is capable of efficient functioning with working fluids impinging from any direction.

Regardless of the incident direction of the working fluid, such as from direction 128, the working surfaces 119 and 120 will only turn in one direction, clockwise in FIG. 10.

Using Bernoulli's principle that the faster a fluid moves the lower its pressure, the improved apparatus uses pressure differences, or gradients to induce a rotation from a resultant ram pressure that results when a working fluid impinges the specific invention. By exposing the textured working surface to the moving working fluid, the ram pressure produced exerts an impulse onto the working surface. As this working surface comes around into the wind, it presents its smooth surface that offers the least resistance to the working fluid. The greater the difference between these ram pressures, the greater the extraction of energy.

To further explain the principle of operation, a top view of the basic wing element structure is shown at 129 in FIG. 11. Straight section 131 and 144 are shown. Each terminates with an arc of a circle 132 and 133 respectively, about a center post 136. Flow 139 of a working fluid either wind or moving water, impinges on the cupped side of the blade. Impingement of the moving working fluid with the blade at 143 acts to slow the incident moving fluid thereby increasing the pressure. A gap 138 is formed between the working surface 130 and the center shaft 136. The flow 140 of working fluid is shown impinging the blade on the upstream side. This flow 140 is constricted about the leading edge 135 and will follow the curve. This produces a low pressure boundary layer on the leading edge surface 135 producing an acceleration of the working fluid around the leading edge, inducing a Venturi effect.

This produces a low pressure zone relative to the pressure of the working fluid 140 before it impinges, and low pressure relative to the air or water (i.e. fluid) pressure behind the working surface at this point. This effect on the leading edge induces a force from the relative higher pressure zone 134 behind the surface with the low pressure boundary layer at 141 resulting in a lower resistance presented to the working surface as the wing element 133 turns into the wind. As the working surface 144 moves into the flow, a low pressure zone 137 is induced behind the working surface 137 as it moves into the flow of the working fluid. Gaps 146 and 145 are held constant as the blades rotate through 360 degrees. The gapping provides an escape for the working fluid to exit by passing through the gaps 145 and 146. This enhances extraction of energy from the wind.

As the working surfaces 130 and 133 rotate about center shaft 136, a cycling of pressures is produced. Pressure gradients are induced to efficiently and effectively use a moving working fluid to induce device mechanical rotation in one direction, independent of the direction of the moving fluid, which in turn can be used directly, or to power a suitable electrical power converter such as a direct current generator, or an alternator to produce electricity.

Low wind speed zones and areas of low average wind speed have been considered poor wind sites, because of the low power levels available in the wind. This invention has increased utility in that the working surfaces as described above effectively convert working fluid impinging from any direction into mechanical or electrical power. For low wind speed zones a schematic view 147 is shown of a device intended to be used with the present invention to effectively increase the relative speed of an impinging working fluid to allow for its effective and efficient conversion to energy. A ring element 149 is formed with a diameter ranging from 0.6-1.1 times the diameter of the device wing working surfaces. A secondary ring 151 ranging in diameter of 1.1-2.1 times the diameter of the first ring 149 is oriented above the first ring. These rings are connected by a surface 154 forming a truncated conic section. A secondary structure 159 identical to the first is inverted and oriented below the first structure with an open zone formed between the elements. This secondary structure includes a ring 157 that ranges from 0.6-1.1 in diameter compared with the diameter of the working surfaces of the device of the present invention. A secondary ring 158 is formed with a diameter of 1.1-2.1 times the diameter of the first ring 157 with a surface 160 formed between the two rings producing a truncated conic surface with an inverted orientation to the first 154 with a zone 150 between them. An impinging flow 153 of working fluid, such as wind, or flowing water has a ram pressure associated with it.

When the working fluid 153 impinges the two elements 148 and 159 a Venturi effect is produced as shown. As the working fluid impinges the 154 and 160 a constriction is produced at 155 on the working fluid, resulting under Bernoulli's principle, with a higher velocity and lower pressure. As the working fluid 155 exits the zone 150 a lower velocity and higher pressure is induced. Each element has a hollow inside volume 162 and 161 respectively, allowing the placement therein of balance of systems electronics further protecting the control circuits and systems from the environment in the field.

View 162 in FIG. 13 shows the device used with the constricting elements described above. The flow constricting element 168 is formed by a primary ring 166 and a secondary larger diameter ring 165 connected by a continuous surface 170 forming a truncated conic section centered by the support shaft 164. A secondary constricting element 176 is similarly formed, and inverted in orientation to the first element, by a primary smaller ring 174 and a larger diameter secondary ring 173 connected by a continuous surface 175 also forming a truncated conic section. A reduced flow area region 171 is formed between the flow constricting elements 168 and 176.

A moving working fluid flow 169 impinging on the constricting elements 168 and 176 experiences an acceleration by Venturi effect, that results in an increase in working fluid velocity in region 171 resulting in a lower pressure consistent with Bernoulli's principle. The device of the present invention is placed in zone in between the constricting elements 168 and 176 and is subjected to the increase in velocity of the working fluid 171. This increase in working fluid relative velocity effectively concentrates the working fluid increasing the amount of energy per unit volume within the working fluid, allowing more effective conversion of the power available in the impinging ram pressure of the working fluid. The constricting elements combine to increase the effectiveness of the power conversion even in low average wind speed sites.

Those learned in the art will appreciate the improved utility and efficiency of this process and apparatus as disclosed herein. Variations and modifications of the present invention still fall under the claims disclosed herein, and do not detract from the spirit or scope of the specific invention.

We claim:

1. A wind turbine apparatus, comprising
    a) an upright shaft defining an upright axis,
    b) at least two blades operatively connected to the shaft to rotate about the shaft axis as the blades are wind driven about said axis,
    c) the lowermost portion of each blade being offset, azimuthally, relative to the uppermost portion of each blade,
    d) baffles carried by the blades to project to receive impingement of wind for creating torque transmitted to the blade to effect blade rotation about said axis,
    e) and means for increasing the velocity of wind approaching said apparatus.

2. The apparatus of claim 1 wherein baffles project from each blade generally toward said axis, along the baffle lengths, which are elongated.

3. The apparatus of claim 2 wherein the baffles projecting from each blade extend in generally the same direction.

4. The apparatus of claim 1 wherein each blade, including said baffles, has one-piece configuration.

5. The apparatus of claim 1 wherein a major extent of each blade has unitary, molded synthetic resin configuration.

6. The apparatus of claim 2 wherein substantially the entire extent of each blade has unitary, molded synthetic resin configuration.

7. The apparatus of claim 6 wherein said resin consists of polyethylene.

8. The apparatus of claim 1 including spaced ribs integral with each blade, and operatively connected to said shaft.

9. The apparatus of claim 8 wherein the baffles extend generally lengthwise of the blade, and toward said ribs.

10. The apparatus of claim 9 wherein the ribs are outstanding from the blade to substantially greater extent than the baffles.

11. A wind turbine apparatus, comprising
    a) an upright shaft defining an upright axis,
    b) at least two blades operatively connected to the shaft to rotate about the shaft axis as the blades are wind driven about said axis,
    c) the lowermost portion of each blade being offset, azimuthally, relative to the uppermost portion of each blade,
    d) baffles carried by the blades to project to receive impingement of wind for creating torque transmitted to the blade to effect blade rotation about said axis,
    e) and including vertically spaced ribs integral with each blade, and operatively connected to said shaft,
    f) including plates integral with the ribs and connecting the ribs to bearings on the shaft.

12. The apparatus of claim 11 wherein the plates associated with both of the blades are interconnected.

13. A wind turbine apparatus, comprising
    a) an upright shaft defining an upright axis,
    b) at least two blades operatively connected to the shaft to rotate about the shaft axis as the blades are wind driven about said axis,
    c) the lowermost portion of each blade being offset, azimuthally, relative to the uppermost portion of each blade,
    d) baffles carried by the blades to project to receive impingement of wind for creating torque transmitted to the blade to effect blade rotation about said axis,
    e) including a relatively large diameter spur gear driven by rotation of the shaft, and a relatively small diameter spur gear meshing with said large diameter gear, and having driving association with an electrical generator.

14. A wind turbine apparatus, comprising
    a) an upright shaft defining an upright axis,
    b) at least two blades operatively connected to the shaft to rotate about the shaft axis as the blades are wind driven about said axis,
    c) the lowermost portion of each blade being offset, azimuthally, relative to the uppermost portion of each blade,
    d) baffles carried by the blades to project to receive impingement of wind for creating torque transmitted to the blade to effect blade rotation about said axis,
    e) and including vertically spaced ribs integral with each blade, and operatively connected to said shaft,
    f) said baffles extending generally lengthwise of the blade, and toward said ribs,
    g) and wherein spaces are provided between the ends of the baffles, the ribs defining air flow channels adjacent the ribs.

15. The combination of claim 14 wherein said spaces have width dimensions between 1 inch and 2 inch.

16. The combination of claim 14 wherein baffles are located in rows, the baffles in at least one row being convex in directions away from the blade.

17. The combination of claim 1 wherein the blades define hollow interiors.

18. The combination of claim 17 wherein elongated channels are sunk in the blades between certain of the baffles and extending in the directions of the baffles.

19. The combination of claim 18 wherein the number of said baffles exceeds the number of said channels.

20. The combination of claim 1 wherein each blade has curved foil configuration extending lengthwise at blade edge extent farthest from the shaft, to face toward the baffles.

21. A wind turbine apparatus, comprising
    a) an upright shaft defining an upright axis,
    b) at least two blades operatively connected to the shaft to rotate about the shaft axis as the blades are wind driven about said axis,
    c) the lowermost portion of each blade being offset, azimuthally, relative to the uppermost portion of each blade,
    d) baffles carried by the blades to project to receive impingement of wind for creating torque transmitted to the blade to effect blade rotation about said axis,
    e) and wherein said blades define hollow interiors,
    f) and wherein each blade has inner and outer walls at opposite sides of the hollow interiors, said walls having locally adjacent extents.

22. The combination of claim 1 wherein the blades have portions that extend in proximity to said shaft, but wherein a gap or gaps is or are defined between said portions and the shaft.

23. A wind turbine apparatus, comprising
    a) an upright shaft defining an upright axis,
    b) at least two blades operatively connected to the shaft to rotate about the shaft axis as the blades are wind driven about said axis,
    c) the lowermost portion of each blade being offset, azimuthally, relative to the uppermost portion of each blade,
    d) baffles carried by the blades to project to receive impingement of wind for creating torque transmitted to the blade to effect blade rotation about said axis,
    e) said blades defining hollow interiors, f) each blade having inner and outer walls at opposite sides of the hollow interiors, said walls having locally adjacent extents, g) and wherein said adjacent extents are thickened proximate elongated channels sunk in the blades.

24. The combination of claim 21 including means for increasing the velocity of wind approaching said apparatus.

25. The combination of claim 1 wherein said means includes a venturi defining a narrowed wind flow zone wherein said blades are located.

26. A wind turbine apparatus, comprising a) an upright shaft defining an upright axis, b) at least two blades operatively connected to the shaft to rotate about the shaft axis as the blades are wind driven about said axis, c) the lowermost portion of each blade being offset, azimuthally, relative to the uppermost portion of each blade, d) baffles carried by the blades to project to receive impingement of wind for creating torque transmitted to the blade to effect blade rotation about said axis, e) and vertically spaced ribs integral with the blades and including structural means integral with the ribs and operatively connecting the ribs to bearings on the shaft.

27. A wind turbine apparatus, comprising a) an upright shaft defining an upright axis, b) at least two blades operatively connected to the shaft to rotate about the shaft axis as the blades are wind driven about said axis, c) the lowermost portion of each blade being offset, azimuthally, relative to the uppermost portion of each blade, d) baffles carried by the blades to project to receive impingement of wind for creating torque transmitted to the blade to effect blade rotation about said axis, e) said blades defining hollow interiors.

* * * * *